UNITED STATES PATENT OFFICE.

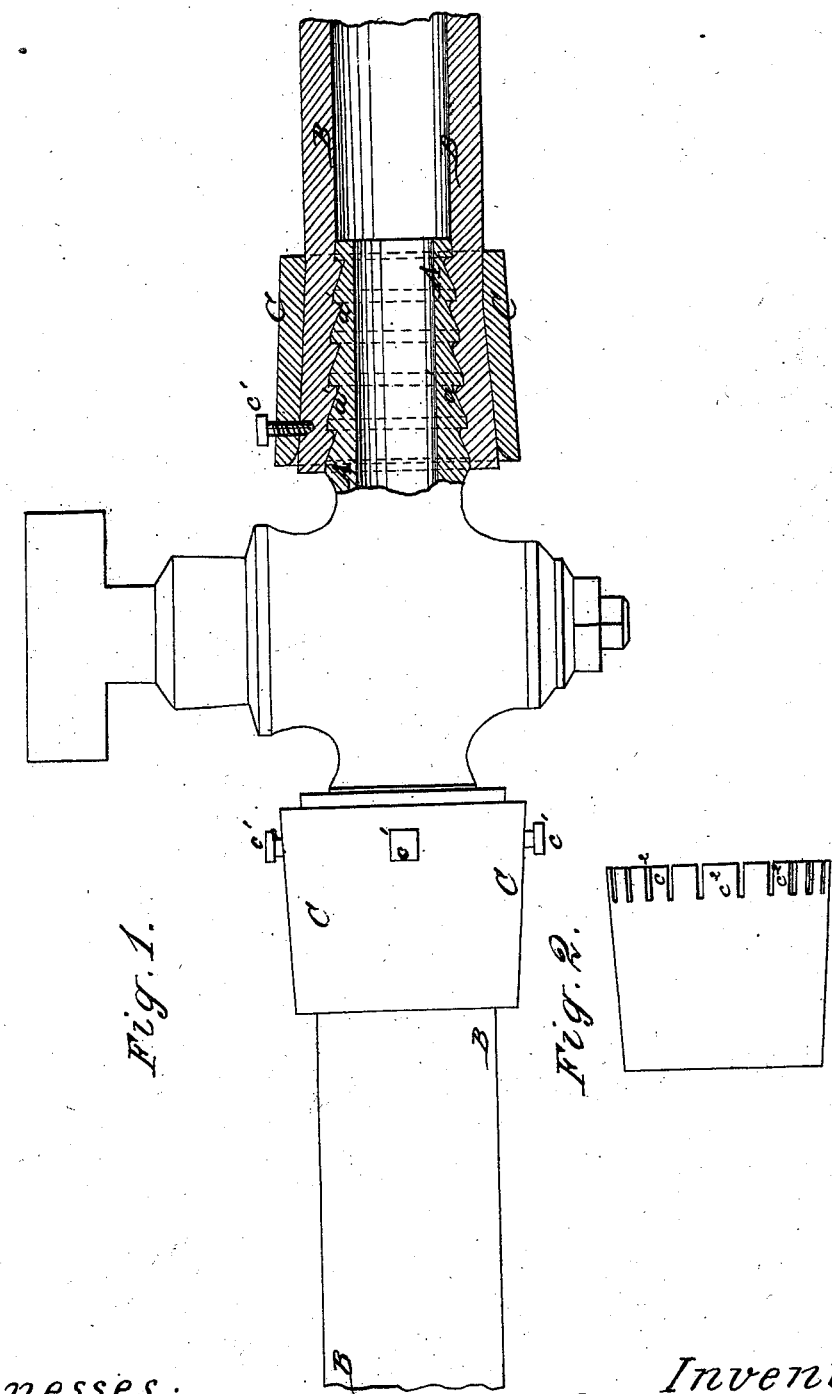

FREDERICK P. HALLBERG, OF GREEN POINT, NEW YORK.

IMPROVEMENT IN WATER-PIPE JOINTS.

Specification forming part of Letters Patent No. 204,033, dated May 21, 1878; application filed April 4, 1878.

*To all whom it may concern:*

Be it known that I, FREDERICK PONTUS HALLBERG, of Green Point, L. I., in the county of Kings and State of New York, have invented a new and Improved Water-Pipe Joint, of which the following is a specification:

The object of my invention is to provide a simple and efficient means of fastening the ends of lead pipes to the shanks of stop-cocks and other cocks, and at the same time causing a perfect water or gas tight joint between them both.

In the accompanying drawing, Figure 1 represents a side view, partly in section, of my improved joint. Fig. 2 is a modification of the collar shown in Fig. 1.

Similar letters of reference indicate corresponding parts.

A is the shank of a common stop-cock, into which the grooves $a'\ a'$ are cut, either parallel with each other or forming a screw, and at some distance apart, one side of the grooves to be slanting, the other side to be vertical, against the side of shank. B is the lead pipe, the end of which has been widened, so as to fit on the shank. C is a loose collar, being conical in shape to correspond with pipe end. After the pipe has been run on the shank this collar is driven up as far as possible, which causes the lead to be pressed down into the grooves of the shank, thus making a tight joint by means of the vertical sides of the grooves, which form rests for the lead to press against, and prevents the pipe from being drawn back.

To prevent the collar from getting loose, there are one or more sets of screws, as shown in Fig. 1, to be screwed down into the lead pipe after the collar is driven up; or, as shown in Fig. 2, the wider part of the collar has small incisions, about one-fourth inch deep, made lengthwise of collar, leaving the edge of same in a toothed condition. After this collar has been driven on the pipe so the lead has been forced into the grooves of the shank, these teeth $c^2\ c^2$ are bent inward, thus forming means to prevent the collar from slipping back.

Having thus described my invention, what I claim as new, and desire to secure by Letters Patent, is—

1. The grooves $a'\ a'$, cut either parallel to each other or forming a screw, and at a distance of not less than one-sixteenth inch apart from each other, having one of their sides vertical against the face of the shank, in combination with the conical collar C, provided with teeth $c^1$, for the purpose described and set forth.

2. The conical collar C, provided with the teeth $c^2\ c^2$, for the purpose described and set forth.

3. The combination of the grooved shank of an ordinary water-cock with the collar C, provided with teeth $c^2 c^2$, for the purpose specified.

FREDERICK PONTUS HALLBERG.

Witnesses:
  H. RYDQVIST,
  CHAS. R. SANDSTREAM.